United States Patent [19]

Komatsu

[11] Patent Number: 5,242,973
[45] Date of Patent: Sep. 7, 1993

[54] TRIHALOPHENOXY TERMINATED POLYCARBONATE RESIN COMPOSITION CONTAINING SALT OF ORGANIC SULFONIC ACID

[75] Inventor: Takashi Komatsu, Ichihara, Japan

[73] Assignee: Idemitsu Petrochemical Co., Ltd., Tokyo, Japan

[21] Appl. No.: 976,904

[22] Filed: Nov. 16, 1992

Related U.S. Application Data

[63] Continuation-in-part of Ser. No. 670,365, Mar. 14, 1991, Pat. No. 5,185,425, which is a continuation-in-part of Ser. No. 585,739, Sep. 20, 1990, abandoned.

[30] Foreign Application Priority Data

Oct. 24, 1989 [JP] Japan .................. 1-274788
Mar. 14, 1990 [JP] Japan .................. 2-061144

[51] Int. Cl.$^5$ .................................. C08L 69/00
[52] U.S. Cl. ........................ 524/611; 524/157; 524/165; 524/173
[58] Field of Search ............. 524/611, 157, 165, 173

[56] References Cited

U.S. PATENT DOCUMENTS 3,751,400  8/1973  Crennan et al. .
4,831,100  5/1989  Komatsu et al. .
5,185,425  2/1993  Komatsu .............. 528/198

FOREIGN PATENT DOCUMENTS 0424800  5/1991  European Pat. Off. .
164322   7/1991  Taiwan .
1541529  3/1979  United Kingdom .

OTHER PUBLICATIONS

Chemical Abstracts, vol. 81, No. 22, Dec. 2, 1974, Columbus, Ohio, US; abstract No. 136938S, "Fire-resistant polycarbonate", p. 25, col. 2; of JP-A-74 35 000 (Idemitsu Kosan Co., Ltd.), Mar. 30, 1974.
WPI, File Supplier, Derwent Publications Ltd., London, GB; AN-76-48521X (26) of JP-A-51 052492 (Idemitsu Kosan KK), May 11, 1976.

*Primary Examiner*—Harold D. Anderson
*Attorney, Agent, or Firm*—Frishauf, Holtz, Goodman & Woodward

[57] ABSTRACT

A polycarbonate resin composition comprising
(a) 100 parts by weight of a polycarbonate comprising
  (1) a repeating unit (I) represented by the following formula:

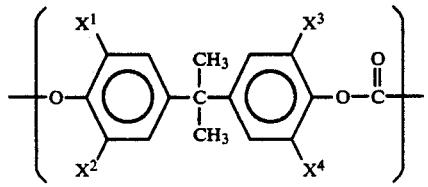

and a repeating unit (II) represented by the following formula:

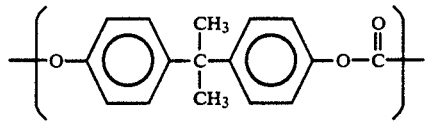

wherein $X^1$ to $X^4$ are each a halogen atom and
  (2) a trihalogenophenoxy group as the end group thereof, the polycarbonate having viscosity average molecular weight of 10,000 to 50,000, and 1 to 10 mol % of the repeating unit (I) in the main chain and
(b) 0.01 to 0.2 part by weight of an alkali metal salt or an alkaline earth metal salt of an organosulfonic acid. The polycarbonate composition is excellent in all of flame retardance, impact resistance, and a thermostability at molding. Accordingly, the polycarbonate resin composition is extensively and effectively used industrially in home electric appliances, office automation devices, construction materials and the like.

18 Claims, 2 Drawing Sheets

TRIHALOPHENOXY TERMINATED POLYCARBONATE RESIN COMPOSITION CONTAINING SALT OF ORGANIC SULFONIC ACID

This application is a continuation-in-part application of application Ser. No. 07/670,365, filed Mar. 14, 1991, now U.S. Pat. No. 5,185,425, which in turn was a continuation-in-part application of application Ser. No. 07/585,739 filed Sep. 20, 1990, now abandoned.

BACKGROUND OF THE INVENTION

1. Field of the Invention

The present invention relates to a polycarbonate resin composition, more particularly, to a polycarbonate resin composition which contains a polycarbonate that is excellent in flame retardance, impact resistance, and thermostability at molding.

2. Background Information

As halogen-containing polycarbonate copolymers having flame retardance, various ones have heretofore been known. They include (i) a copolymer of tetrabromobisphenol A (TBA) and bisphenol A (BPA) (Japanese Patent Publication No. 24660/1972), (ii) a copolymer of tetrabromobisphenolsulfone (TBS) and BPA (Japanese Patent Application Laid-Open No. 123294/1976), (iii) a copolymer of tetrabromothiobisphenol (TBTDP) and BPA (Japanese Patent Application Laid-Open No. 99226/1981), (iv) a copolymer of the statistical mixture of halogenated bisphenols and BPA (Japanese Patent Application No. 136796/1976), and (v) a blend of the copolymer of thiobisphenol (TDP) and BPA and the copolymer of above (i) (Japanese Patent Application Laid-Open No. 50065/1979).

These copolymers are obtained by copolymerization of halogenated bisphenols resulted from halogen-substitution of benzene nucleus in bisphenols for the purpose of containing halogen in an amount necessary for a sufficient flame retardance. All of these copolymerizations, however, require these halogenated bisphenols in a comparatively large amount, and accordingly, the mechanical strength of the resulting polycarbonate (particularly, impact resistance) is lowered.

Another example of a halogen-containing polycarbonate is a polycarbonate in which halogenated phenol is used as the end terminator (Japanese Patent Publication No. 40715/1971). Said polycarbonate, however, is not provided with both of an excellent flame-retardance and a high mechanical-strength.

In order to overcome the above disadvantages, a polycarbonate was produced by a process of copolymerizing BPA, TBA and TDP (Japanese Patent Application Laid-Open No. 140597/1977). According to said process, the resulting polycarbonate is excellent in both of flame retardance and mechanical strength, but it is not improved so much in moldability.

The present inventor's group proposed, as a novel polycarbonate being excellent in flame retardance, mechanical strength and other properties, a polycarbonate which is obtained by using pentahalogenophenol as an end terminator, and by copolymerizing BPA and TBA (Japanese Patent Application Nos. 79227/1989 and 79228/1989). Said polycarbonate, however, was found to have a few problems in thermostability at molding, although it is excellent in flame retardance and mechanical strength.

SUMMARY OF THE INVENTION

An object of the present invention is to provide a polycarbonate resin composition which contains a polycarbonate that is excellent with respect of flame retardance, and mechanical strength, and also in thermostability at molding.

Other objects and advantages of the present invention will become apparent from the following explanation.

According to the earnest investigation by the present inventors, it was found that the above objects are attained by the use of a polycarbonate resin having a trihalogenophenol as the end terminator. The present invention has been accomplished on such a finding. The present invention provides a polycarbonate resin composition comprising (a) 100 parts by weight of a polycarbonate (1) having a main claim comprising a repeating unit (I) represented by the general formula (A):

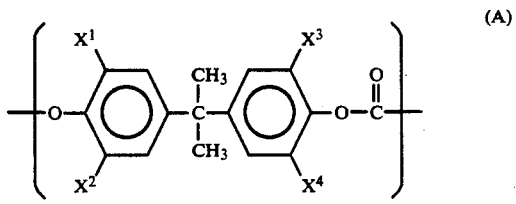

wherein $X^1$ to $X^4$ are each a halogen atom, and a repeating unit (II) represented by the general formula (B):

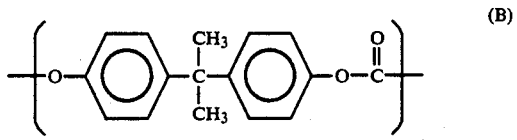

(2) having, at the terminal thereof, a trihalogenophenoxy group or groups represented by the general formula (C):

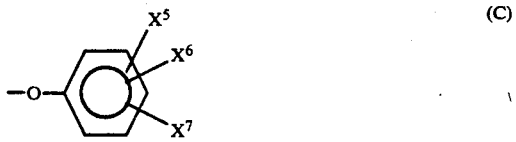

wherein $X^5$ to $X^7$ are each a halogen atom; and (3) having a viscosity average molecular weight of 10,000 to 50,000, and containing 1 to 10 mol % of the repeating unit (I) in the main chain; and (b) 0.01 to 2 part by weight of an alkali metal salt or an alkaline earth metal salt of an organosulfonic acid.

DESCRIPTION OF THE PREFERRED EMBODIMENTS

Figure 1:
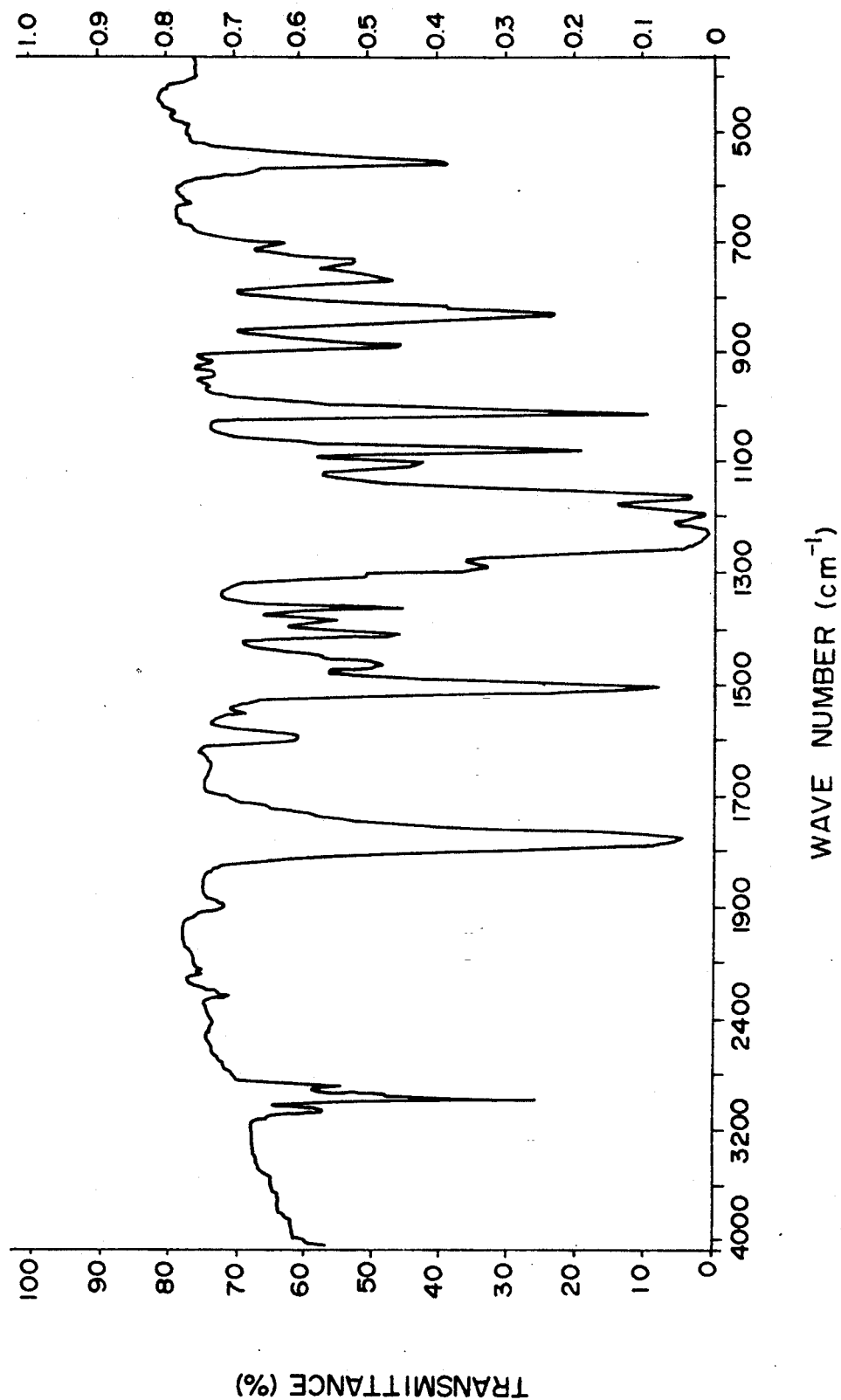
FIG. 1 is an infrared absorption (IR) spectrum, by the thin film method, of the copolymer obtained in Example 1.
Figure 2:
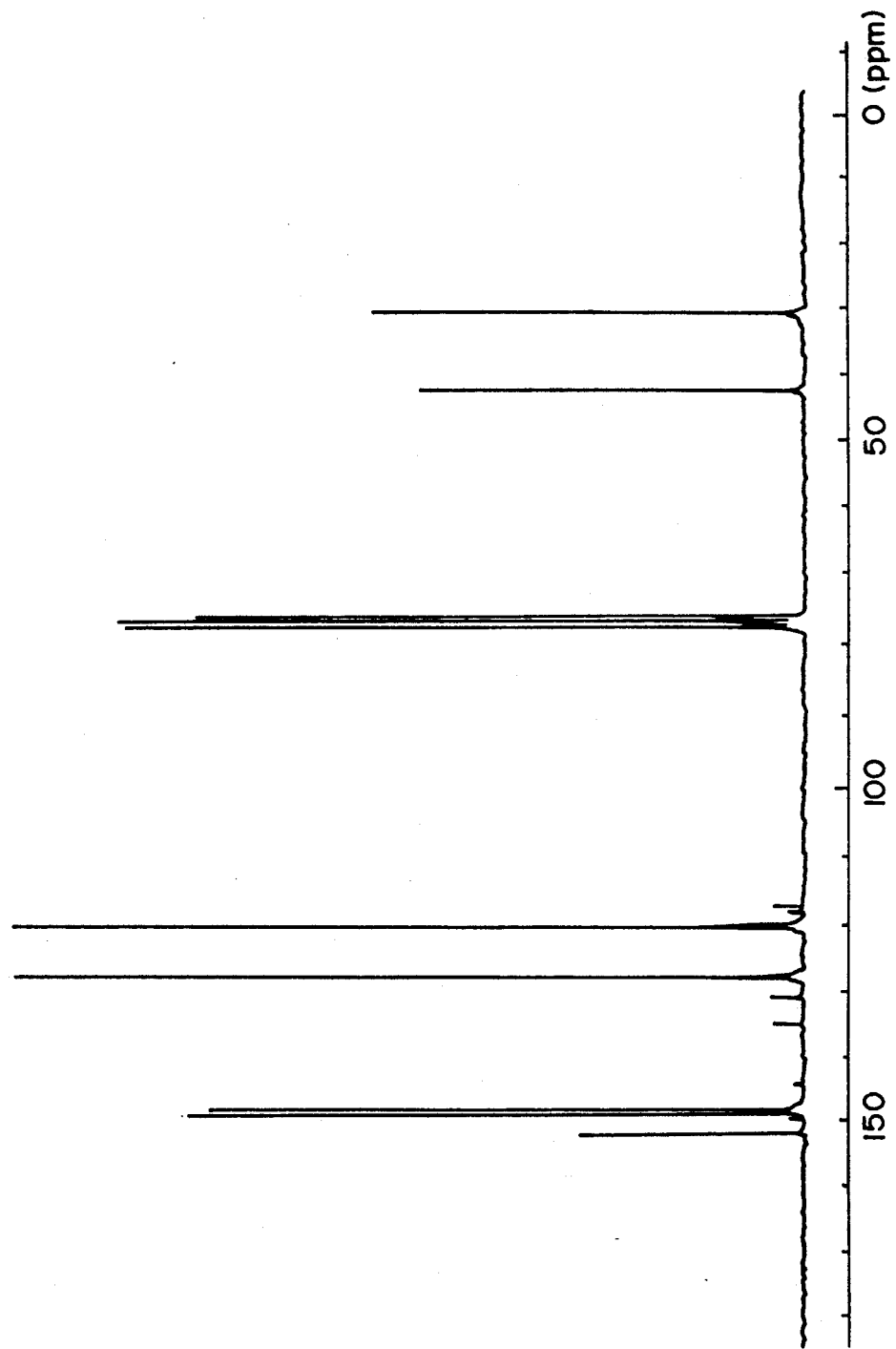
FIG. 2 is a nuclear magnetic resonance (NMR) spectrum (solvent: deuteriochloroform) of said copolymer.

The polycarbonate for use in the present invention has the repeating unit (I) represented by the general formula (A) mentioned above and the repeating unit (II) represented by the formula (B). Herein $X^1$ to $X^4$ in the general formula (A) are each a halogen atom such as a bromine atom, a chlorine atom, and a fluorine atom. Said $X^1$ to $X^4$ may be identical or different, but they are identical in most cases.

The polycarbonate of the present invention has a trihalogenophenoxy group or groups represented by the general formula (C) at the end, particularly both ends, of the molecules. $X^5$ to $X^7$ in said general formula (C) also indicate each a halogen atom such as a bromine atom, a chlorine atom, and a fluorine atom, as $X^1$ to $X^4$ described above.

$X^1$ to $X^4$ in the repeating unit (I) mentioned above may be identical to or different from $X^5$ to $X^7$ in the general formula (C).

In the polycarbonate for use in the present invention, the mole fraction of the repeating unit (I) based on the total of the repeating unit (I) and the repeating unit (II) in the main chain must be 0.01 to 0.1, preferably 0.02 to 0.06. If the mole fraction of the repeating unit (I) in the main chain is less than 0.01, the resulting polycarbonate has a lower flame retardance, while if it is in excess of 0.1, the mechanical strength of the resulting polycarbonate becomes poor.

As to the polymerization degree of the polycarbonate for use in the present invention, the viscosity average molecular weight is preferably in the range of 10,000 to 50,000. If the viscosity average molecular weight is less than 10,000, the mechanical strength such as impact resistance is insufficient.

The polycarbonate for use in the present invention has the above-mentioned repeating units (I) and (II), and trihalogenophenoxy group or groups represented by the general formula (C) at the end thereof, and comprises a random copolymer, a block copolymer, or an alternating copolymer of them.

Said polycarbonate may contain a small amount of a repeating unit other than the above repeating units (I) and (II) in the molecular chain thereof. As the third copolymers to constitute these repeating units, bisphenol sulfone (BPS) or TDP is used. The content of them should be 0 to 20 mol %, preferably 0 to 10 mol % based on the total amount of BPA and Tetrahalogenobisphenol A. If the content of it is in excess of 20 mol %, the mechanical strength of the resulting polycarbonate is poor.

The polycarbonate for use in the present invention can be produced in various methods. Preferred methods for producing them are following two.

According to the first method, an aqueous alkali solution (e.g., aqueous solution of sodium hydroxide, potassium hydroxide, and sodium carbonate) of tetrahalogenobisphenol A (e.g., tetrabromobisphenol A, tetrachlorobisphenol A, and tetrafluorobisphenol A) represented by the general formula:

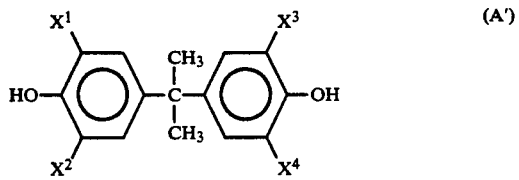

wherein $X^1$ of $X^4$ are as defined before, an aqueous alkali solution of bisphenol A (BPA) represented by the formula:

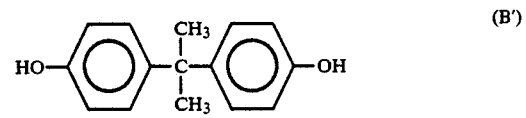

an aqueous alkali solution of trihalogenophenol (e.g., tribromophenol, trichlorophenol, and trifluorophenol) represented by the general formula:

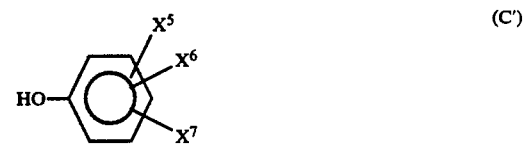

wherein $X^5$ to $X^7$ are as defined before are mixed with a solvent such as methylene chloride, chlorobenzene, pyridine, chloroform, and carbon tetrachloride, and a catalyst such as triethylamine and trimethylbenzylammonium chloride, in prescribed ratios and the resulting mixture is stirred. Then, phosgene is blown into the mixture to proceed with interfacial polycondensation. The reaction system is preferred to be cooled with water or ice since the reaction is exothermic. In this reaction, the reaction system becomes acidic as the reaction proceeds, so it is preferred to maintain pH at 10 or more by adding an alkali while measuring with a pH meter.

In the above reaction, a part (50 mol % or smaller) of trihalogenophenol can be replaced with a monohydric phenol such as p-tert-butylphenol and phenol, to be used in combination.

In the above polycondensation reaction, tetrahalogenobisphenol A of the formula (A') constitutes the repeating unit (I) of the resulting polycarbonate, and bisphenol A of the formula (B') constitutes the repeating unit (II), so the ratio of abovementioned tetrahalogenobisphenol A to bisphenol A to be placed is determined depending on the mole fraction of each of the repeating units (I) and (II) of the polycarbonate to be produced, or the proportion of halogen atoms to be contained. On the other hand, the amounts of trihalogenophenol and phosgene introduced specify the polymerization degree of each of the repeating units (I) and (II), further the polymerization degree of the polycarbonate itself, and consequently the molecular weight thereof. Accordingly, the amounts of trihalogenophenol and phosgene to be introduced are determined depending upon the purpose of use. In blowing phosgene, the rate of phosgene to be blown per hour should be controlled so that a sufficient amount of phosgene might have been introduced at the completion of the reaction.

When the reaction product obtained in this way is introduced into a large amount of a precipitant such as methanol, then the polycarbonate of the present invention is precipitated out.

In the above reaction, various carbonate-forming compound derivatives such as bromophosgene, diphenyl carbonate, di-p-tolylcarbonate, phenyl-p-tolylcarbonate, di-p-chlorophenyl carbonate and dinaphtyl carbonate can be used in place of phosgene.

According to the second method, a polycarbonate oligomer is prepared in advance from bisphenol A and phosgene; the oligomer thus obtained, an aqueous alkali solution of tetrahalogenobisphenol A and an aqueous alkali solution of trihalogenophenol, a solvent such as methylene chloride which is capable of dissolving said oligomer, and further a catalyst such as triethylamine and trimethylbenzyl ammoniumchloride are mixed in prescribed ratios and stirred to be prepolymerized; and subsequently an aqueous alkali solution of bisphenol A and, if necessary, p-tert-butylphenol are added to proceed with polycondensation reaction. The resulting reaction product is poured into a large amount of a precipitant (e.g., methanol), and then the polycarbonate of the present invention is precipitated out.

The polycarbonate for use in the present invention can be efficiently produced by the abovementioned methods. In addition, also following methods are suitably used.

(i) Tetrahalogenobisphenol A and phosgene are reacted to prepare a polycarbonate oligomer in advance, and said oligomer is reacted with bisphenol A and trihalogenophenol in the presence of a solvent, an aqueous alkali solution, and a catalyst which are suitable for the reaction;

(ii) a polycarbonate oligomer prepared from bisphenol A (or tetrahalogenobisphenol A) and phosgene is reacted with tetrahalogenobisphenol A (or bisphenol A) and trihalogenophenol in the presence of a solvent, an aqueous alkali solution, a catalyst and so forth which are suitable for the reaction, and in that method, phosgene is blown in the reaction system;

(iii) an oligomer is prepared from bisphenol A and phosgene, and an oligomer is prepared from tetrahalogenobisphenol A and phosgene, and these two kinds of oligomers are reacted in the presence of trihalogenophenol and a solvent, an aqueous alkali solution, a catalyst and so forth which are suitable for the reaction; and (iv) in the above method, a multi-stage polymerization, in which polymerization is carried out at two or more stages, is effectively employed.

The polycarbonate for use in the present invention can be obtained according to any of these methods.

The polycarbonate for use in the present invention has a viscosity average molecular weight of 10,000 to 50,000, preferably 13,000 to 50,000, as described above. In order to control the viscosity average molecular weight to be in that range, the amount of trihalogenophenol mainly used as the molecular weight controlling agent is appropriately regulated. Usually, the amount of trihalogenophenol is in the ratio of 0.01 to 0.1 (mole) based on the amount of diphenols which constitute the main chain.

In adding BPA, an aqueous alkali solution and catalyst such as triethylamine to polycarbonate oligomer, to produce polycarbonate by interfacial polycondensation, the ratio of catalyst to diphenols is usually 0.0005 to 0.03 (mol/mol).

When polycarbonate oligomer is added with BPA, an aqueous alkali and catalyst such as triethylamine, to produce a polycarbonate by interfacial polycondensation, the amount of caustic alkali is usually 0.1 to 5.0 to the amount of diphenols (mol/mol).

As described above, the polycarbonate for use in the present invention is excellent in flame-retardance, sufficiently high in impact resistance, and in addition, superior in thermostability at molding. More specifically, in this polycarbonate, flame retardance is V-0 as an indication according to UL-94 (Underwriter's Laboratories Subject 94) (1/16 inch in thickness), Izod impact resistance as an indication of impact resistance is 40 kg cm/cm or more, and Yellowness Index (YI) after staying for 30 minutes at 300° C., as an indication of thermostability, is 20 or less.

Various alkali metal salt or alkaline earth metal salt of organosulfonic acid can be used as Component (b) of the composition of the present invention. Typical examples are (1) an alkali metal sulfonate or an alkaline earth metal sulfonate of a perfluoroalkane, (2) an alkali metal salt or an alkaline earth metal salt of an aliphatic sulfonic acid, (3) an alkali metal salt or an alkaline earth metal salt of a monomeric or a polymeric phenolester sulfonic acid, and (4) an alkali metal salt or an alkaline earth metal salt of an aromatic sulfoxide. Among them, an alkali metal sulfonate of perfluoroalkane is particularly preferred.

An alkali metal sulfonate or an alkaline earth metal sulfonate of the perfluoroalkane of (1) above is represented by the formula:

$$(C_nF_{2n+1}SO_3)_mM$$

wherein, n indicates the integer of 1 to 10, M indicates an alkali metal or alkaline earth metal such as Na, K, Li, Ca, and Mg, and m indicates the valence of M, examples of which are described in Japanese Patent Publication No. 40445/1972. Specifically, they include sodium perfluoromethylsulfonate, potassium perfluoromethylsulfonate, sodium perfluoroethylsulfonate, potassium perfluoroethylsulfonate, sodium perfluorobutylsulfonate, potassium perfluorooctylsulfonate, sodium perfluorooctylsulfonate, and calcium diperfluorobutylsulfonate.

The above-mentioned (2) alkali metal salt or alkaline earth metal salt of an aliphatic sulfonic acid is represented by the general formula:

$$(X_aR')_s(X_bR)(SO_3M)]_p$$

wherein, X indicates an electron-attracting group such as halogen, $NO_2$, trihalomethyl, and cyano group, R indicates an aliphatic group having 1 to 10 carbon atoms, R' indicates an aryl group having 1 to 2 aromatic rings, M indicates an alkali metal or alkaline earth metal, a and b each indicate an integer of 1 to 11, and s indicates an integer of 0 to 5 (when s=0, R is an aliphatic group having 2 to 10 carbon atoms, and X is chlorine or bromine), and p indicates an integer of 1 to 4. Specific examples of these compounds are described in Japanese Patent Application Laid-Open No. 65555/1977.

The above-mentioned (3) alkali metal salt or alkaline earth metal salt of a monomeric or a polymeric phenolester sulfonic acid includes those represented by the general formula:

$$R^1_z[(O_qA)_uX'_y(O_rB)_v]_w$$

wherein, A and B are groups represented by the formula $R^2(SO_3M)_kR^3_i$, wherein $R^2$ is an aryl group having 1 to 4 aromatic rings, $R^3$ is an electron-attracting group, M is an alkali metal or an alkaline earth metal, k is an integer of 0 to 4, and i is an integer of 0 to 10; $R^1$ is an organic residue having 1 to 20 carbon atoms; X' is —CO—, —CS, —SO—, —SO$_2$—, —PO—, —PS—, or Si; z is an integer of 0 to 3; u, q, r and w are each an integer of 1 to 4; y is an integer of 1 or 2, and v is an integer of 0 to 4. Specifically, the compounds described in Japanese Patent Application No. 54741/1977 are mentioned.

The above-mentioned (4) alkali metal salt or alkaline earth metal of a sulfonic acid of an aromatic sulfoxide is represented by the general formula:

$$R^4(SO)R^5(SO_3M)_{1\sim 6}(X'')_{0\sim 11}$$

wherein, $R^4$ and $R^5$ are independently an aryl group having 1 to 2 aromatic rings or an aliphatic group having 1 to 6 carbons, $R^4$ and $R^5$ are at least one aromatic ring, M is an alkali metal or an alkaline earth metal and $X''$ is an alkyl group having 1 to 6 carbon atoms or an electron-attracting group. Specifically, the compounds described in Japanese Patent Application Laid-Open No. 19335/1985 are mentioned.

In the composition of the present invention, 0.01 to 0.2 part by weight, preferably 0.01 to 0.15 part by weight of an alkali metal salt or an alkaline earth metal salt of an organosulfonic acid as Component (b) is compounded in 100 parts by weight of polycarbonate as Component (a). If the proportion of Component (b) is less than 0.01 part by weight, it is impossible to impart a high flame retardance to the composition. If the proportion exceeds 0.2 part by weight, the transparency of the composition becomes low, and the use of the composition meets various limitations.

The composition of the present invention generally comprises the polycarbonate and the alkali metal salt or the alkaline earth metal sulfonate of a perfluoroalkane. However, in addition, the composition may contain, if desired, one or more of a releasing agent, a stabilizer, a lubricant, an antioxidant and an ultraviolet absorbant, so long as the transparency of the polycarbonate is not impaired.

Accordingly, the polycarbonate resin composition of the present invention is extensively and effectively used industrially such as materials for home electric appliances, office automation devices, or as construction materials, sheets, and so forth.

The present invention will be explained in greater detail with reference to the following examples.

PREPARATION EXAMPLE

Preparation of Polycarbonate Oligomer of Bisphenol A

In a 2-liter flask equipped with a stirrer, 91 g of bisphenol A (BPA), 330 ml of methylene chloride and 560 ml of 2.0N aqueous solution of sodium hydroxide were placed, and stirred, and then phosgene was blown into the resulting mixture over 70 minutes while stirring and cooling on water bath. The reaction mixture was allowed to stand at room temperature, then a methylene chloride solution of oligomer was isolated as a lower layer. The oligomer has a concentration of 320 g/L (L=liter), a number average molecular weight of 850, and a concentration of the chloroformate group of 0.7 mol/L.

EXAMPLE 1

In a 50-liter reactor equipped with stirrer, 10 L of polycarbonate oligomer prepared in the above preparation Example, 1.8 L of an aqueous sodium hydroxide solution of tetrabromobisphenol A (TBA) and tribromophenol (TBP) (consisting of 250 g (0.460 mol) of TBA, 150 g (0.453 g) of TBP, 78.6 g (1.96 mol) of sodium hydroxide and 1.35 L of water) and 1.8 ml (0.013 mol) of triethylamine were placed in, and stirred at 500 rpm. After 60 minutes, 3.9 L of an aqueous sodium hydroxide solution of BPA (consisting of 457 g (2.00 mol) of BPA, 267 g (6.68 mol) of sodium hydroxide and 3.42 L of water) and 6.1 L of methylene chloride were added, and the resulting mixture was stirred.

After stirred for 60 minutes, the reaction product was separated into aqueous layer and methylene chloride layer containing the copolymer formed.

This methylene chloride layer was washed with water, an acid (0.1N hydrochloric acid) and water, methylene chloride was removed under reduced pressure at 40° C. to obtain a white powder of copolymer. This white copolymer was dried at 120° C. for one day and night, and then melted by the use of an extruder to be pelletized. The glass transition temperature (Tg) of the pellet was 152.6° C. The viscosity average molecular weight was 23,900, and the distribution of molecular weight was measured by the use of gel permeation chromatography, a distribution having a single peak at the abovementioned value was shown. An NMR analysis showed that the content of TBA (repeating unit (I)) in the main chain said copolymer was 3.1 mol %.

Then, said pellets were injection-molded at 300° C. and under the injection pressure of 55 kg/cm2 in an injection molding machine. The test piece was measured for Izod impact strength and flame retardance. The flow value of the pellet was measured by a Koka-type flow tester.

The bromine content of the resulting pellet was 6.4% by weight. The bromine content was determined by alkali-decomposition of the sample, and analyzed by the Volhard method.

Further, the test on thermostability at molding was conducted as follows. The pellet was injection-molded to stay at 300° C. for 30 minutes, and then, test sample was formed. The resulting test piece was determined for yellowness index (YI) by the use of transmission-type photometer.

The results are shown in Table 1.

EXAMPLES 2 and 3

The procedure of Example 1 was repeated except that aqueous sodium hydroxide solution of TBA and TBP was changed as shown in Table 1. The results are shown in Table 2.

EXAMPLE 4

The procedure of Example 1 was repeated except that the aqueous sodium hydroxide solution of TBA and TBP was changed as shown in Table 1. The results are shown in Table 2.

EXAMPLE 5

The procedure of Example 1 was repeated except that the aqueous sodium hydroxide solution of TBA and TBP was changed as in Table 1. The results are shown in Table 2.

COMPARATIVE EXAMPLES 1 and 2

The procedure of Example 1 was repeated except that the amount of TBA in the aqueous sodium hydroxide solution of TBA and TBP was changed as in Table 1, and that p-tert-butylphenol (PTBP) was used in place of TBP. The results are shown in Table 2.

COMPARATIVE EXAMPLE 3

The procedure of Example 1 was repeated except that the aqueous sodium hydroxide solution of TBA and TBP was changed as shown in Table 1. The results are shown in Table 2.

COMPARATIVE EXAMPLES 4 and 5

The procedure of Example 1 was repeated except that the amount of TBA in the aqueous sodium hydroxide solution of TBA and TBP was changed as shown in Table 1, and that pentabromophenol (PBP) was used in place of TBP. The results are shown in Table 2.

TABLE 1

| | Content of Each Component in Aqueous Sodium Hydroxide Solution of TBA and TBP (g) | | | | | |
|---|---|---|---|---|---|---|
| | TBA | BPS | TDP | TBP | PTBP | NaOH |
| Example 1 | 250 | — | — | 150 | — | 78.6 |
| Example 2 | 391 | — | — | 150 | — | 102.4 |
| Example 3 | 247 | — | — | 179 | — | 85.0 |
| Example 4 | 180 | 74 | — | 179 | — | 109.2 |
| Example 5 | 180 | — | 161 | 179 | — | 162.3 |
| Comparative Example 1 | 444 | — | — | — | 81.1 | 78.6 |
| Comparative Example 2 | 371 | — | — | — | 81.1 | 62.7 |
| Comparative Example 3 | 895 | — | — | 150 | — | 187.6 |
| Comparative Example 4 | 113 | — | — | 222 (PBP) | — | 55.4 |
| Comparative Example 5 | 145 | — | — | 294 (PBP) | — | 72.6 | aqueous sodium hydroxide solution of BPA (consisting of 457 g (2.00 mol) of BPA, 267 g (6.68 mol) of sodium hydroxide, and 3.42 L of water) and 6.1 L of methylene chloride were added, and the resulting mixture was stirred. After being stirred for 60 minutes, the reaction product was separated into an aqueous layer and a methylene chloride layer containing the copolymer formed.

This methylene chloride layer was washed with water, an acid (0.1N hydrochloric acid), and water in that order, and then separated. From this methylene chloride layer, methylene chloride was removed under reduced pressure at 40° C. to obtain a white powder of copolymer (PC-1). This powder was dried at 120° C. for a whole day and night, and then melted by the use of an extruder, to be pelletized. As the result of measuring the pellet, the glass transition temperature (Tg) of the pellet was 151.9° C.

The viscosity average molecular weight was 23,600, and when the distribution of molecular weight was measured by the use of gel permeation chromatography, a distribution having a single peal was shown. A NMR analysis showed that the contents of TBA and TBP in the main chain of said copolymer were 3.0 mol% and 3.0 mol%, respectively.

TABLE 2

| | Composition of Copolymers in the Main Chain (mol %) | | | | Composition of TBP (mol %) | Whole Content of Bromine (wt %)[*1] | Viscosity Average Molecular Weight[*2] |
|---|---|---|---|---|---|---|---|
| | BPA | TBA | BPS | TDP | | | |
| Example 1 | 96.9 | 3.1 | 0 | 0 | 3.0 | 6.4 | 23,900 |
| Example 2 | 95.1 | 4.9 | 0 | 0 | 2.9 | 8.4 | 23,700 |
| Example 3 | 96.7 | 3.3 | 0 | 0 | 3.8 | 7.3 | 19,300 |
| Example 4 | 95.5 | 2.4 | 2.1 | 0 | 3.9 | 6.4 | 19,300 |
| Example 5 | 92.3 | 2.5 | 0 | 5.2 | 3.8 | 6.5 | 19,700 |
| Comparative Example 1 | 94.5 | 5.5 | 0 | 0 | 0 | 6.5 | 19,900 |
| Comparative Example 2 | 95.4 | 4.6 | 0 | 0 | 0 | 5.5 | 20,800 |
| Comparative Example 3 | 88.9 | 11.1 | 0 | 0 | 3.0 | 15.5 | 22,100 |
| Comparative Example 4 | 98.6 | 1.4 | 0 | 0 | 3.1 (PBP) | 6.3 | 23,700 |
| Comparative Example 5 | 98.2 | 1.8 | 0 | 0 | 4.1 (PBP) | 8.2 | 18,100 |

| | Flow Value[*3] (ml/sec) | Izod Impact Resistance[*4] (kg cm/cm) | Flame Retardance[*5] (1/16") | Thermostability at Molding (YI)[*6] |
|---|---|---|---|---|
| Example 1 | $2.4 \times 10^{-2}$ | 88 | V-0 | 8 |
| Example 2 | $2.6 \times 10^{-2}$ | 57 | V-0 | 9 |
| Example 3 | $6.3 \times 10^{-2}$ | 54 | V-0 | 10 |
| Example 4 | $5.6 \times 10^{-2}$ | 52 | V-0 | 10 |
| Example 5 | $5.9 \times 10^{-2}$ | 72 | V-0 | 9 |
| Comparative Example 1 | $6.2 \times 10^{-2}$ | 12 | V-0 | 7 |
| Comparative Example 2 | $5.9 \times 10^{-2}$ | 82 | V-2 | 8 |
| Comparative Example 3 | $2.1 \times 10^{-2}$ | 11 | V-0 | 12 |
| Comparative Example 4 | $2.6 \times 10^{-2}$ | 90 | V-0 | 29 |
| Comparative Example 5 | $2.2 \times 10^{-2}$ | 74 | V-0 | 34 |

EXAMPLE 6

In a 50-Liter reactor equipped with a stirrer, 10 L (L=Liter) of polycarbonate oligomer solution prepared in the above Preparation Example, 1.8 L of aqueous sodium hydroxide solution of tetrabromobisphenol A(TBA) and tribromophenol (TBP) (consisting of 245 g (0.450 mol) of TBA, 150 g (0.453 mol) of TBP, 78.6 g (1.96 mol) of sodium hydroxide and 1.35 L of water), and 1.8 ml (0.013 mol) of triethylamine were placed, and stirred at 500 rpm. After 60 minutes, 3.9 L of an The resulting sample was alkali-decomposed, and the bromine content of the sample was determined to be 6.2% by weight according to the Volhard method.

EXAMPLE 7

In a 50-liter reactor equipped with a stirrer, 10 L of polycarbonate oligomer solution prepared in the above Preparation Example, 1.7 L of aqueous sodium hydroxide solution of TBA and TBP (consisting of 172 g (0.316 mol) of TBA, 180 g (0.544 mol) of TBP, 72.6 g (1.82 mol) of sodium hydroxide and 1.35 L of water) and 1.8 ml (0.013 mol) of triethylamine were placed, and stirred at 500 rpm.

After 60 minutes, 3.9 L of aqueous sodium hydroxide solution of BPA (consisting of 457 g (2.00 mol) of BPA, 267 g (6.68 mol) of sodium hydroxide and 3.4 L of water) and 6.1 L of methylene chloride were added, and the resulting mixture was stirred.

After being stirred for 60 minutes, the reaction product was separated into an aqueous layer and a methylene chloride layer containing the copolymer formed.

This methylene chloride layer was washed with water, an acid (0.1N hydrochloric acid) and water in that order, and then separated. From this methylene chloride layer, methylene chloride was removed under reduced pressure at 40° C., to obtain a white powder of copolymer (PC-2).

Further, the powder was dried at 120° C. for a whole day and night, and then melted by the use of an extruder to be pelletized. As the result of measuring the pellet, its Tg was 150.8° C. The viscosity average molecular weight of said pellet was 19,800. A NMR analysis showed that the contents of TBA and TBP in the main chain of said copolymer were 2.1 mol% and 3.8 mol%, respectively.

The resulting sample was alkali-decomposed, and according to the Volhard method, the bromine content of the sample was found to be 6.0% by weight.

EXAMPLES 8 to 11 AND COMPARATIVE EXAMPLES 6 AND 7

The copolymer (PC-1) prepared in Example 6 and alkali metal salts of various organosulfonic acid were dry-blended in the ratios shown in the Table 3, and pelletized at 280° to 300° C. by a single screw extruder having an inner diameter of 50 mm.

Subsequently, the pellets were injection-molded under an injection pressure of 55 kg/cm² to produce a test piece. Said test piece was measured for Izod impact strength, flame retardance, and total light-transmittance.

The flow value of the pellet was measured by a Koka-type flow tester. The results are shown in Table 3.

EXAMPLE 12

The procedure of Example 6 was repeated except that 68 g of p-tert-butylphenol (PTBP) was used in place of 150 g of tribromophenol (TBP), and that 430 g of tetrabromobisphenol A was used instead of 245 g of the same to obtain a copolymer (PC-3) having a bromine content of 6.2% by weight.

COMPARATIVE EXAMPLES 8 AND 9

The procedure of Comparative Example 6 or Example 8 was repeated except that the copolymer (PC-3) obtained in above Example 12 was used in place of copolymer (PC-1).

The results are shown in Table 3.

TABLE 3

| | PC-1 (part by weight) | PC-3 (part by weight) | Flame Retarder (part by weight) | Flow Value[*3] (ml/sec) | Izod Impact Strength[*4] (kg-cm/cm) | Flame Retardance[*5] 1/16 inch | Flame Retardance[*5] 1/32 inch | Total Light-transmittance[*6] (%) |
|---|---|---|---|---|---|---|---|---|
| Comparative Example 6 | 100 | 0 | 0 | $2.3 \times 10^{-2}$ | 83 | — | V-2 | 91 |
| Example 8 | 100 | 0 | 0.05[*1] | $2.6 \times 10^{-2}$ | 79 | — | V-0 | 91 |
| Example 9 | 100 | 0 | 0.10[*1] | $2.8 \times 10^{-2}$ | 81 | — | V-0 | 90 |
| Example 10 | 100 | 0 | 0.15[*1] | $2.9 \times 10^{-2}$ | 78 | — | V-0 | 89 |
| Example 11 | 100 | 0 | 0.05[*2] | $2.7 \times 10^{-2}$ | 84 | — | V-0 | 91 |
| Comparative Example 7 | 100 | 0 | 0.30[*1] | $3.3 \times 10^{-2}$ | 80 | — | V-0 | 58 |
| Comparative Example 8 | 0 | 100 | 0 | $2.5 \times 10^{-2}$ | 70 | — | V-2 | 90 |
| Comparative Example 9 | 0 | 100 | 0.05[*1] | $2.8 \times 10^{-2}$ | 28 | — | V-0 | 90 |

[*1] Potassium perfluorobutylsulfonate
[*2] Potassium perfluorooctylsulfonate
[*3] Measured according to JIS-K-7210 (Load: 160 kg/cm²)
[*4] Measured according to JIS-K-7110 by the use of a sample piece of ⅛ inch in thickness.
[*5] Vertical Combustion Test was carried out according to Underwriter's Laboratories Subject 94 (UL-94).
[*6] Measured according to JIS-K-7105.

What is claimed is:

1. A polycarbonate resin composition comprising
   (a) 100 parts by weight of a polycarbonate, said polycarbonate comprising
      (1) a main chain comprising a repeating unit (I) represented by the following formula:

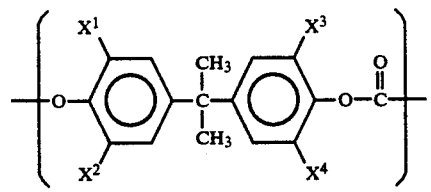

wherein $X^1$ to $X^4$ are each a halogen atom, and a repeating unit (II) represented by the following formula:

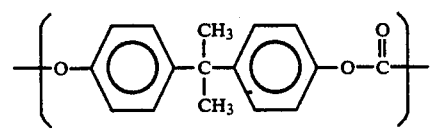

and (2) a trihalogenophenoxy group represented by the following formula:

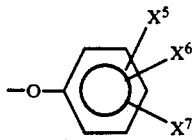

wherein $X^5$ to $X^7$ are each a halogen atom,
as the end group thereof;
said polycarbonate having a viscosity average molecular weight of 10,000 to 50,000, and the repeating unit (I) in the main chain is in a proportion of 1 to 10 mol %; and (b) 0.01 to 0.2 part by weight of an alkali metal salt or an alkaline earth metal salt of an organosulfonic acid.

2. The polycarbonate resin composition as defined in claim 1, wherein the trihalogenophenoxy group is a tribromophenoxy group.

3. The polycarbonate resin composition as defined in claim 1, wherein the proportion of the repeating unit (I) in the main chain is 2 to 6 mol %.

4. The polycarbonate resin composition as defined in claim 1, wherein $X^1$ to $X^4$ are each a bromine atom.

5. The polycarbonate resin composition as defined in claim 1, wherein the alkali metal salt or the alkaline metal salt of the organosulfonic acid is selected from the group consisting of (a) an alkali metal sulfonate or an alkaline earth metal sulfonate of a perfluoroalkane, (b) an alkali metal salt or an alkaline metal salt of an aliphatic sulfonic acid, (c) an alkali metal salt or an alkaline earth metal salt of a monomeric or a polymeric phenolester sulfonic acid and (d) an alkali metal salt or an alkaline earth metal salt of an aromatic perfluoroalkane.

6. The polycarbonate resin composition as defined in claim 1, wherein the alkali metal salt or the alkaline metal salt of the organosulfonic acid is an alkali metal sulfonate of a perfluoroalkane or an alkaline earth metal sulfonate of a perfluoroalkane having the following formula:

$$(C_nF_{2n+1}SO_3)_mM$$

wherein
n is 1 to 10,
M is selected from the group consisting of Na, K, Li, Ca and Mg and
m is the valency of M.

7. The polycarbonate resin composition as defined in claim 6, wherein said alkali metal sulfonate of a perfluoroalkane or alkaline earth metal sulfonate of a perfluoroalkane is selected from the group consisting of sodium perfluoromethylsulfonate, potassium perfluoromethylsulfonate, sodium perfluoroethylsulfonate, potassium perfluoroethylsulfonate, sodium perfluorobutylsulfonate, potassium perfluorobutylsulfonate, potassium perfluorooctylsulfonate, sodium perfluorooctylsulfonate, and calcium diperfluorobutylsulfonate.

8. The polycarbonate composition as defined in claim 5, wherein the alkali metal salt or the alkaline earth metal salt of the organosulfonic acid is an alkali metal sulfonate of a perfluoroalkane.

9. The polycarbonate composition as defined in claim 5, wherein the alkali metal salt or the alkaline earth metal salt of the organosulfonic acid is an alkali metal salt or an alkaline earth metal salt of an aliphatic sulfonic acid of the following formula:

$$(X_aR')_s((X_bR)(SO_3M))_p$$

wherein X is an electron-attracting group selected from the group consisting of a halogen, $NO_2$, a trihalomethyl and a cyano group, R is an aliphatic group having 1 to 10 carbon atoms, R' is an aryl group having 1 to 2 aromatic rings, M is an alkali metal or alkaline earth metal, a and b are each an integer of 1 to 11, and s is an integer of 0 to 5, when s=0, R is an aliphatic group having 2 to 10 carbon atoms, and X is chlorine or bromine, and p is an integer of 1 to 4.

10. The polycarbonate resin composition as defined in claim 5, wherein the alkali metal salt or the alkaline earth metal salt of the organosulfonic acid is an alkali metal salt or an alkaline earth metal salt of a monomeric or a polymeric phenolester sulfonic acid of the following formula:

$$R^1_z((O_qA)_uX'_y(O_rB)_v)_w$$

wherein, A and B are groups of the formula $R^2(SO_3M)_kR^3_i$, wherein $R^2$ is an aryl group having 1 to 4 aromatic rings, $R^3$ is an electron-attracting group, M is an alkali metal or an alkaline earth metal, k is an integer of 0 to 4 and i is an integer of 0 to 10, $R^1$ is an organic residue having 1 to 20 carbon atom, X' is —CO—, —CS—, —SO—, —SO$_2$—, —PO—, —PS—, or Si, z is an integer of 0 to 3, u, q, r and w are each an integer of 1 to 4, y is an integer of 1 or 2 and v is an integer of 0 to 4.

11. The polycarbonate resin composition as defined in claim 5, wherein the alkali metal salt or the alkaline earth metal salt of the organosulfonic acid is an alkali metal salt or an alkaline earth metal of a sulfonic acid of an aromatic sulfoxide of the following formula:

$$R^4(SO)R^5(SO_3M)_{1\sim 6}(X'')_{0\sim 11}$$

wherein, $R^4$ and $R^5$ are independently an aryl group having 1 to 2 aromatic rings or an aliphatic group having 1 to 6 carbons, $R^4$ and $R^5$ are at least one aromatic ring, M is alkali metal or alkaline earth metal and X'' is an alkyl group having 1 to 6 carbon atoms or an electron-attracting group.

12. The polycarbonate resin composition as defined in claim 5, wherein the alkali metal salt or the alkaline earth metal salt of the organosulfonic acid is in an amount of 0.01 to 0.15 part by weight.

13. The polycarbonate resin composition as defined in claim 1, wherein $X^1$ to $X^7$ are the same or different and are a halogen atom selected from the group consisting of bromine, chlorine and fluorine.

14. The polycarbonate resin composition as defined in claim 2, wherein the proportion of the repeating unit (I) in the main chain is 2 to 6 mol %.

15. The polycarbonate resin composition as defined in claim 2, wherein $X^1$ to $X^4$ are each a bromine atom.

16. The polycarbonate resin composition as defined in claim 3, wherein $X^1$ to $X^4$ are each a bromine atom.

17. The polycarbonate resin composition as defined in claim 14, wherein $X^1$ to $X^4$ are each a bromine atom.

18. The polycarbonate resin composition as defined in claim 17, wherein the viscosity average molecular weight is 13,000 to 50,000.

* * * * *